United States Patent [19]

Toyoda

[11] Patent Number: 4,737,808
[45] Date of Patent: Apr. 12, 1988

[54] BLADE TYPE SHUTTER

[75] Inventor: Yasuhiro Toyoda, Yokohama, Japan

[73] Assignee: Canon Kabushiki Kaisha, Tokyo, Japan

[21] Appl. No.: 910,612

[22] Filed: Sep. 23, 1986

[30] Foreign Application Priority Data

Oct. 9, 1985 [JP] Japan .................. 60-155564[U]

[51] Int. Cl.⁴ ............................................. G03B 9/40
[52] U.S. Cl. ................................. 354/246; 354/249
[58] Field of Search ............... 354/246, 247, 248, 249, 354/250

[56] References Cited

U.S. PATENT DOCUMENTS

| 4,114,174 | 9/1978 | Onda et al. | 354/249 |
| 4,220,409 | 9/1980 | Inoue | 354/247 |
| 4,231,650 | 11/1980 | Saito et al. | 354/246 |
| 4,245,905 | 1/1981 | Takayama | 354/246 |

Primary Examiner—A. A. Mathews
Attorney, Agent, or Firm—Fitzpatrick, Cella, Harper & Scinto

[57] ABSTRACT

A blade type shutter adapted for use in photographic cameras and so forth comprising: a front curtain assembly having at least one front blade arranged to travel in linked relationship with two front curtain arms; and a rear curtain assembly having at least one rear blade arranged to travel in linked relationship with two rear curtain arms. This shutter further includes a spring capable of generating a force in the direction in which the spring is opened. This spring presses one of the front curtain arms in the direction in which it travels during an aperture opening operation while applying a load to one of the rear curtain arms in the direction reverse to that in which it travels in a shutter closing operation.

8 Claims, 2 Drawing Sheets

FIG. 1A
FIG. 1B
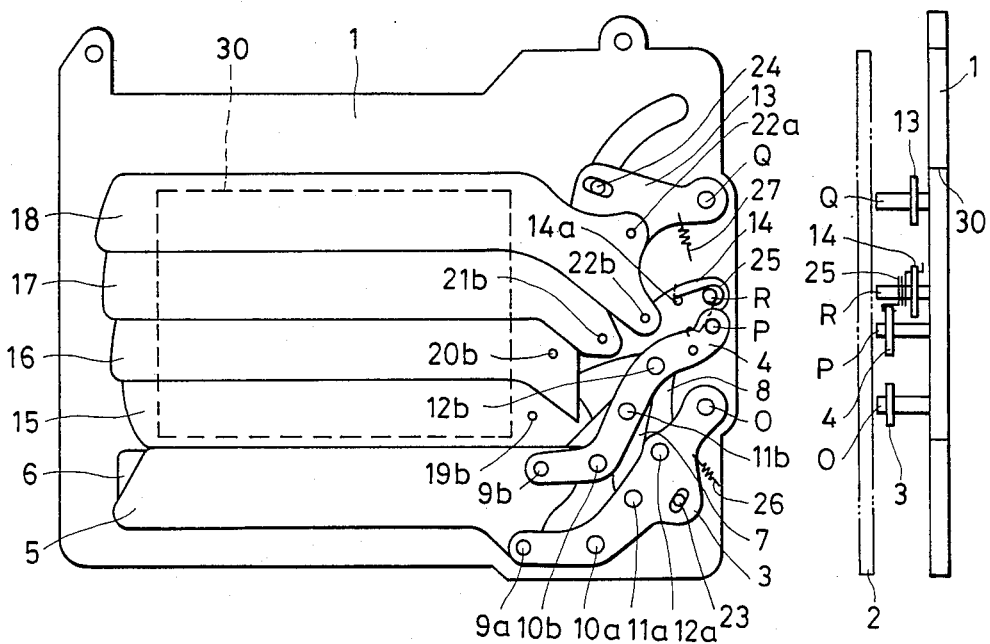
FIG. 2
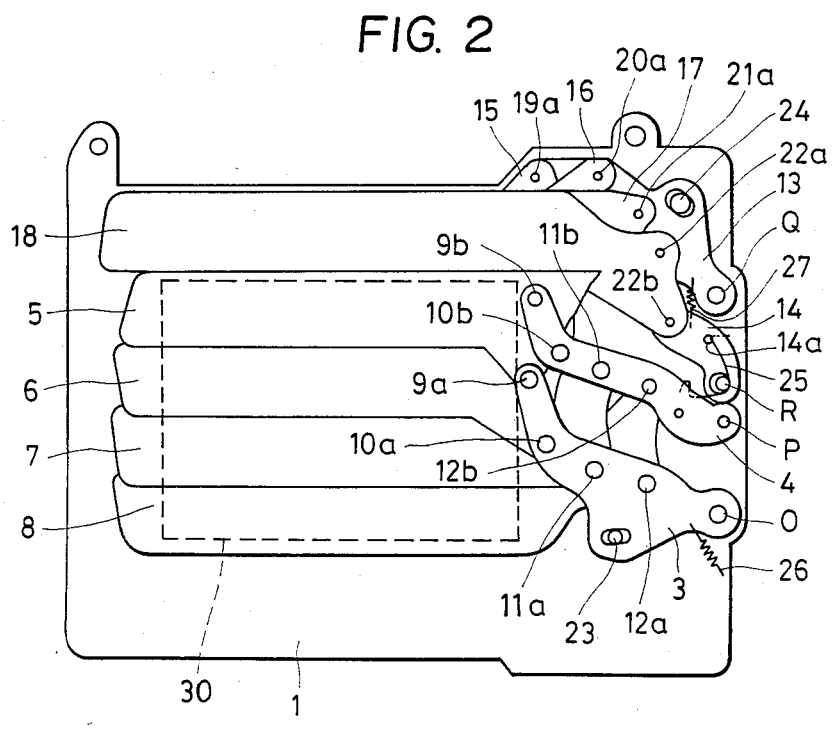

BLADE TYPE SHUTTER

BACKGROUND OF THE INVENTION

1. Field of the Invention

The present invention generally relates to blade type shutters for photographic cameras, and more particularly to a blade type shutter with a mechanism capable of stabilizing the width of an exposure slit formed between a front curtain and a rear curtain while they are travelling across an exposure aperture.

2. Description of the Prior Art

In general, blade type shutters have heretofore been provided with force generating means such as springs for generating a force that will act to open and close the shutter, shutter driving members to which the force generating means are directly secured, pins projecting from the shutter driving members and arms having holes or slots. The pins are fitted in the holes or slots so that the arms may be interlockingly rotated. Similarly, in the conventional arrangement, each blade is pivotably connected to the corresponding arms through the engagement between the pins and the holes or slots.

However, the above-described pin-slot (or pin-hole) connection needs a small gap to be left therebetween, and this gap is prone to result in undesirable looseness during the shutter operation at the points where the pins and slots or holes are connected. This looseness further results in unwanted variations in the positional relationship between the shutter blades. Therefore, such a prior-art blade type shutter involves difficulties in that each time the shutter is cocked, the stationary positions of the shutter blades are varied, thus making it difficult to fix the starting lines of the blades during the shutter operation. In particular, this problem leads to fluctuations in shutter speeds due to changes in the manner in which the camera body is held. Moreover, as the number of shutter operations is increased, the pins and the holes or slots gradually become worn, and this accentuates the tendency for fluctuation in shutter speeds.

U.S. Pat. No. 4,231,650 proposes an improved mechanism for solving the above-described problems. According to this prior proposal, the shutter blade mechanism includes first biasing spring means for urging a front curtain assembly with respect to a base plate and second biasing spring means for urging a rear curtain assembly with respect to the base plate, and each arm is biased in one direction only by the associated springs so that each pin may be consistently kept in contact with the corresponding hole or slot. Thus the influence exerted by the looseness between the pins and the holes or slots is reduced.

However, since this prior arrangement needs two biasing springs for each of the front and rear curtain assemblies, variation between the forces generated by the two springs of each pair has an undesirable influence on the shutter travelling characteristics. In particular, during high-speed shutter operation wherein the exposure slit may be minimized in width, there is a risk of causing the front and rear curtains to travel in a closed state, that is, without forming any slit.

SUMMARY OF THE INVENTION

Accordingly, it is a first object of the present invention to provide an improved blade type shutter wherein the looseness between the pins and the holes or slots is prevented from adversely affecting the shutter operation, thereby improving the accuracy with which the shutter blades are positioned.

It is a second object of the present invention to provide an improved blade type shutter capable of positively ensuring the width of an exposure slit even for very short exposure times.

To these ends, the present invention provides a blade type shutter which comprises front and rear curtain assemblies and a pressing means arranged to apply a force to the assemblies. The front curtain assembly has at least one front blade which is arranged to travel in linked relationship with a front curtain driving arm and a front curtain auxiliary arm. The rear curtain assembly has at least one rear blade which is arranged to travel in linked relationship with a rear curtain driving arm and a rear curtain auxiliary arm. The pressing means is arranged to apply a force to the front and rear curtain assemblies with a pressing force against the front curtain assembly in the direction in which it moves in a shutter opening operation and a pressing force against the rear curtain assembly in a direction reverse to that in which it travels in a shutter closing operation.

The above and other objects, features and advantages of the present invention will become apparent from the following description of the preferred embodiment thereof, taken in conjunction with the accompanying drawings.

BRIEF DESCRIPTION OF THE DRAWINGS

FIG. 1A is a front elevational view of a blade type shutter in accordance with the present invention in which the shutter has just completed travelling;

FIG. 1B a side elevational view schematically showing a part of the shutter shown in FIG. 1A;

FIG. 2 is a front elevational view similar to FIG. 1A, showing the shutter as cocked;

DESCRIPTION OF THE PREFERRED EMBODIMENT

Figure 3:
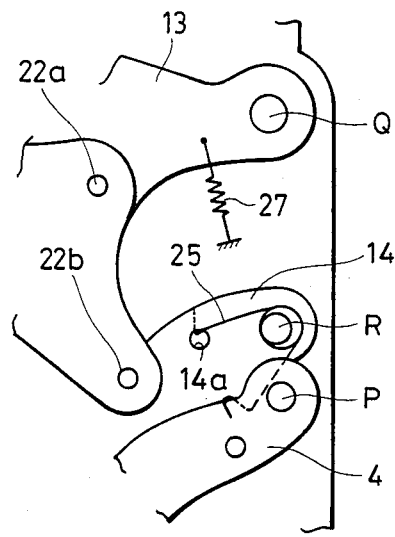
FIG. 3 is a fragmentary enlarged view of a slit stabilizing mechanism of the shutter shown in FIG. 1A in which the shutter is uncocked.

Referring first to FIGS. 1A, 1B and 2, the illustrated embodiment of this invention comprises the following constituents: a base plate 1; a cover plate 2 parallel to and spaced from the base plate 1; a shaft O protrudingly mounted on the base plate 1; a front curtain driving arm 3 supported by the shaft O for rotation about the axis thereof; a shaft P protrudingly mounted on the base plate 1; a front curtain auxiliary arm 4 supported by the shaft P for rotation about the axis thereof; front blades 5 to 8 pivotably supported on the front curtain driving arm 3 and the front curtain auxiliary arm 4 respectively by the engagement between pins 9a, 9b; 10a, 10b; 11a, 11b; and 12a, 12b and corresponding holes in each of the arms 3 and 4. The blades 5 to 8 are linked by the arms 3 and 4, which are parallel with the base plate 1 so that the blades overlap each other in parallel, thereby consistently enabling the front blades 5 to 8 to travel parallel with one another and vertically across an exposure aperture 30 formed in the base plate 1.

The illustrated embodiment of this invention further comprises the following constituents: a shaft Q protrudingly mounted on the base plate 1; a rear curtain driving arm 13 supported by the shaft Q for rotation about the axis thereof; a shaft R protrudingly mounted on the base plate 1; a rear curtain auxiliary arm 14 supported by the shaft R for rotation about the axis thereof; rear blades 15 to 18 pivotably supported on the rear curtain driving arm 13 and the rear curtain auxiliary arm 14 respectively by the engagement between pins 19a, 19b; 20a, 20b; 21a, 21b; and 22a, 22b and the corresponding holes in each of the arms 13 and 14. The rear blades 15 to 18 are linked by the arms 3 and 4, which are parallel with the base plate 1 so that these blades overlap each other in parallel, thereby consistently enabling the rear blades 15 to 18 to travel parallel with one another and vertically across the exposure slit 30.

A front curtain driving lever 23 is pin-slot-coupled with the front curtain driving arm 3, and a rear curtain driving lever 24 is pin-slot-coupled with the rear curtain driving arm 4.

Figure 4:
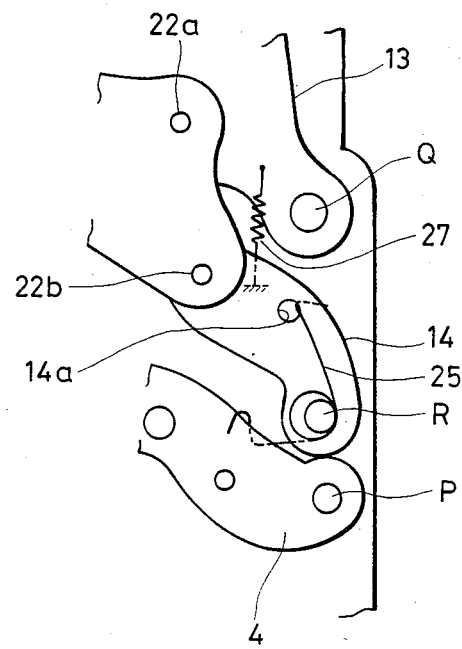
FIG. 4 is a fragmentary enlarged view of a slit stabilizing mechanism of the shutter shown in FIG. 2 in which the shutter is cocked.

As shown in detail in FIGS. 3 and 4, a coiled spring 25 for preventing looseness has a central wound portion fitted onto the shaft R, and one end of the spring 25 is engaged with the peripheral edge of the front curtain auxiliary arm 4 while the other end is fitted in a hole 14a of the rear curtain auxiliary arm 14. The spring 25 functions to apply a remarkably small force to the arms 4 and 14 in the direction in which they move away from each other. A front curtain driving spring 26 pulls the front curtain driving arm 3 in the direction in which the arm 3 travels, namely, counterclockwise as viewed in the Figures, and a rear curtain driving spring 27 pulls the rear curtain driving arm 13 in the direction in which the arm 13 travels, namely, counterclockwise as viewed in the Figures. As shown by a dotted line in FIGS. 1A and 2, the base plate 1 includes the exposure aperture 30.

Specifically, the shutter having the above-described construction comprises a front curtain assembly and a rear curtain assembly; the former assembly including the front curtain driving arm 3, the front curtain auxiliary arm 4, the front blades 5 to 8 and their respective pin connections to the arms 3 and 4, while the latter assembly includes the rear curtain driving arm 13, the rear curtain auxiliary arm 14 and the rear blades 15 to 18 and their respective pin connections to the arms 13 and 14.

A shutter operating mechanism does not constitute the subject matter of the present application. Hence, for the sake of simplicity, such mechanism is not specifically illustrated in the accompanying drawings. Nevertheless, for reference, the operation of the shutter of this invention will be briefly described below.

As will readily be understood by those skilled in the art, after a camera shutter release has been actuated, various preparatory operations are carried out before exposure is made, that is, a deviating mirror is swung upwardly and the aperture of a lens is stopped down. Upon completion of these preparatory operations, the front curtain assembly first travels from the cocked position shown in FIG. 2 downwardly as viewed in the same Figure. In consequence, the front blades 5 to 8 are removed from the aperture 30 to permit exposure of film positioned behind the aperture. After a selected exposure time has elapsed, the rear curtain assembly travels downwardly as viewed in FIG. 2 from the cocked position shown in FIG. 2, and the aperture 30 is thereby covered by the rear blades 15 to 18 as shown in FIG. 1A. The exposure of one shot is completed through the above-described shutter operation.

When the front and rear curtain assemblies complete travelling and reach the uncocked position shown in FIG. 1A, these assemblies are cocked in association with the ensuing camera sequence, such as film winding. The assemblies travel upwardly as viewed in FIG. 1A and are restored in the position shown in FIG. 2 where the shutter is completely cocked.

The following description particularly concerns the operation of the slit forming front blade 5 of the front curtain assembly during the above-described operational sequence.

As shown, the front blade 5 has one end movably coupled with the arms 3 and 4 through the pins 9a and 9b fitted into the holes of these arms, and the arms 3 and 4 are pivotably fitted onto the shafts O and P, respectively. Each of the fitted portions has a slight tolerance for smooth operation. In some cases, this slight tolerance causes the horizontal positioning of the front blade 5 to be inaccurate, whereby the blade 5 is inclined; and this results in variations in shutter speeds on both sides of the aperture 30. The illustrated embodiment succeeds in eliminating the above-described drawback by adding the coiled spring 25 for the purpose of preventing any unwanted looseness from being produced by the tolerance. Specifically, the front curtain auxiliary arm 4 is pressed slightly counterclockwise by one end of the coiled spring 25, thereby consistently biasing the above-described shafts O, P, and the pins 9a, 9b forming part of the fitted portions. Since the shafts O, P and the pins 9a, 9b are biased in constant directions, irrespective of the manner in which the camera body is held, undesirable looseness can be absorbed by the coiled spring 25. In such a biased state, if the position of the front blade 5 is slightly adjusted or the blade 5 is designed to be accurately held in position, it is possible to solve problems such as variation in shutter speeds. On the other hand, the rear curtain auxiliary arm 14 of the rear curtain assembly is pressed slightly clockwise by the coiled spring 25. Therefore, the above-described problems of prior shutters can be successfully solved in the same manner.

As will be evident from the above description and the drawings, the sole coiled spring 25 for eliminating looseness presses the front and rear curtain assemblies in the direction in which they are caused to move away from each other. Specifically, for the purpose of effecting exposure, the spring 25 presses the front curtain assembly lightly in a downward direction as viewed in the drawings. On the other hand, the spring 25 also applies a slight load against the rear curtain assembly in an upward direction, as viewed in the drawings, for the purpose of determining the exposure time. In particular, in cases where the slit width formed between the front and rear curtains is made especially narrow for short exposure times, the coiled spring 25 applies a force in such a way that the slit width is widened, thereby eliminating the above-described problems of the prior proposal, such as the curtains travelling in a closed state.

In the illustrated embodiment, since the sole coiled spring 25 for eliminating looseness presses the front and rear curtain assemblies at the same time, there is no material change in the angle formed between both ends of the spring 25 during a high-speed shutter operation in which the accuracy of shutter speeds greatly influences correct exposure, that is, the slit width is especially narrow. Accordingly, the coiled spring 25 applies a substantially constant force to the front and rear curtain assemblies during the period from the start of travelling to the end thereof, whereby it is possible to essentially eliminate the adverse influence exerted on shutter running performance in the prior art by looseness at each of the fitted portions of the shutter.

The blade type shutter according to the present invention, which features the arrangement and operation mentioned above, offers the following various advantages.

As described above, since the shutter of this invention is equipped with a single spring for pressing the front curtain assembly and causing it to travel while acting as a load upon the travel of the rear curtain assembly, it is possible to eliminate looseness at each of the fitted portions. Therefore, improvements in the accuracy of positioning the shutter blades can be efficiently achieved with low production costs, and correct exposure can be attained with high precision. Moreover, the slit width can be positively obtained even during high-speed shutter operation. In particular, when using high-speed shutters in which the slit width greatly affects correct exposure, the spring acts to apply a substantially constant force to the front and rear curtain assemblies. Hence, the present invention successfully provides an exposure-slit stabilizing mechanism capable of eliminating adverse influence on shutter travelling performance.

While the above provides a full and complete disclosure of the invention, various modifications, alternative constructions and equivalents may be employed without departing from the true spirit and scope of the invention. Therefore, the above description and illustrations should not be construed as limiting the scope of the invention, which is defined solely by the appended claims

What is claimed is:

1. A blade type shutter comprising:
   (a) a front curtain assembly having at least one front blade which is arranged to travel in linked relationship with a front curtain driving arm and a front curtain auxiliary arm;
   (b) a rear curtain assembly having at least one rear blade which is arranged to travel in linked relationship with a rear curtain driving arm and a rear curtain auxiliary arm; and
   (c) pressing means arranged to apply a force between said front and rear curtain assemblies, said pressing means pressing said front curtain assembly in the direction in which it travels in a shutter opening operation while applying a load to said rear curtain assembly in the direction reverse to that in which it travels in a shutter closing operation.

2. A shutter according to claim 1, wherein said pressing means is arranged to apply a force to said front and rear curtain assemblies via said front curtain auxiliary arm and said rear curtain auxiliary arm, respectively.

3. A shutter according to claim 1, wherein said pressing means includes a spring.

4. A shutter according to claim 3, wherein said spring is a coiled spring.

5. A shutter according to claim 3, wherein said spring as said pressing means is arranged to generate a force acting in opposite directions by which said spring is opened, one end of said spring being engaged with at least one of said front curtain arms so as to press said arms in the direction in which they travel in a shutter opening operation, while the other end is engaged with at least one of said rear curtain arms so as to apply a load to said arms in the direction reverse to that in which they travel in a shutter closing operation.

6. A blade type shutter comprising:
   (a) a front curtain assembly having at least one front blade which is arranged to travel in linked relationship with a front curtain driving arm and a front curtain auxiliary arm;
   (b) a rear curtain assembly having at least one rear blade which is arranged to travel in linked relationship with a rear curtain driving arm and a rear curtain auxiliary arm;
   (c) front curtain driving means arranged to apply a driving force to said front curtain driving arm for causing said front curtain assembly to travel in an aperture opening direction;
   (d) rear curtain driving means arranged to apply a driving force to said rear curtain driving arm for causing said rear curtain assembly to travel in a aperture closing direction; and
   (e) pressing means for applying a force between said front and rear curtain auxiliary arms, said pressing means pressing said front curtain auxiliary arm in the direction in which it travels in an aperture opening operation, while applying a load to said rear curtain auxiliary arm in the direction reverse to that in which it travels in an aperture closing operation.

7. A shutter according to claim 6, wherein said pressing means includes a spring.

8. A shutter according to claim 3, wherein said spring is a single coiled spring.

* * * * *

UNITED STATES PATENT AND TRADEMARK OFFICE
CERTIFICATE OF CORRECTION

PATENT NO.  : 4,737,808
DATED       : April 12, 1988
INVENTOR(S) : YASUHIRO TOYODA It is certified that error appears in the above-identified patent and that said Letters Patent is hereby corrected as shown below:

COLUMN 6

Line 36, "a" should read --an--.

Signed and Sealed this

Twentieth Day of September, 1988

Attest:

DONALD J. QUIGG

Attesting Officer

Commissioner of Patents and Trademarks